(12) United States Patent
Ando et al.

(10) Patent No.: US 7,182,833 B2
(45) Date of Patent: Feb. 27, 2007

(54) METHOD OF BONDING ADHEREND

(75) Inventors: Katsuhiro Ando, Akashi (JP); Junji Takase, Akashi (JP); Fumio Kawakubo, Kobe (JP)

(73) Assignee: Kaneka Corporation, Osaka (JP)

( * ) Notice: Subject to any disclaimer, the term of this patent is extended or adjusted under 35 U.S.C. 154(b) by 272 days.

(21) Appl. No.: 10/258,391

(22) PCT Filed: Apr. 27, 2001

(86) PCT No.: PCT/JP01/03678

§ 371 (c)(1),
(2), (4) Date: Feb. 10, 2003

(87) PCT Pub. No.: WO01/83629

PCT Pub. Date: Nov. 8, 2001

(65) Prior Publication Data

US 2004/0074598 A1    Apr. 22, 2004

(30) Foreign Application Priority Data

Apr. 28, 2000    (JP) ............................ 2000-130556

(51) Int. Cl.
C09J 133/08  (2006.01)
C09J 125/02  (2006.01)
C09J 163/00  (2006.01)
C09J 171/02  (2006.01)

(52) U.S. Cl. ...................... 156/329; 528/901; 525/404; 525/476

(58) Field of Classification Search ................ 156/329; 528/901; 525/404, 476
See application file for complete search history.

(56) References Cited

U.S. PATENT DOCUMENTS 2,537,520 A * 1/1951 Eger ........................... 523/506
3,632,557 A * 1/1972 Brode et al. .................. 528/28
4,000,594 A * 1/1977 Kirk, Jr. ....................... 52/241
5,464,888 A   11/1995 Owen
6,025,445 A * 2/2000 Chiba et al. ............. 525/326.5
6,207,766 B1 * 3/2001 Doi et al. .................... 525/403
6,486,289 B1 * 11/2002 Yamaguchi et al. .......... 528/18
6,569,980 B1 * 5/2003 Masaoka et al. .............. 528/27

FOREIGN PATENT DOCUMENTS

| EP | 0 265 929 A2 | 5/1988 |
| EP | 0 584 978 A1 | 3/1994 |
| EP | 0 641 829 A2 | 3/1995 |
| EP | 0 649 878 A2 | 4/1995 |
| EP | 0 918 062 A1 | 5/1999 |
| EP | 1 024 170 A1 | 8/2000 |
| EP | 1 090 960 A1 | 4/2001 |
| EP | 1 134 251 A1 | 9/2001 |
| JP | 63-43986 A | 2/1988 |
| JP | 3-263478 A | 11/1991 |
| JP | 4-312671 A | 11/1992 |
| JP | 05-320596 | * 12/1993 |
| JP | 8-165389 A | 6/1996 |
| JP | 9-143446 A | 6/1997 |
| JP | 9-176481 A | 7/1997 |
| JP | 2001-139893 A | 5/2001 |
| WO | 98/47939 | * 10/1998 |
| WO | WO 99/19405 A1 | 4/1999 |
| WO | 00/56818 | * 9/2000 |

* cited by examiner

*Primary Examiner*—Kuo-Liang Peng
(74) *Attorney, Agent, or Firm*—Foley & Lardner LLP

(57) ABSTRACT

By using a high viscosity moisture-curable adhesive composition comprising at least one polymer or resin selected from the group consisting of (A) a reactive silyl group-containing polyoxyalkylene polymer, (B) a reactive silyl group-containing saturated hydrocarbon polymer, (C) a copolymer of which molecular chain is substantially made of one or more alkyl (meth)acrylate monomer unit(s) and (D) an epoxy resin, it becomes possible to bond an adherend to a substrate without open time and without temporary tacking after application.

11 Claims, No Drawings

METHOD OF BONDING ADHEREND

TECHNICAL FIELD

The present invention relates to a method of adhesion by which an adherend can be bonded to a substrate using a specific curable composition without need of temporary tacking and, after curing, a sufficient level of bond strength can be attained. It relates also to a method of adhesion by which good adhesion can be attained to an inorganic material or a metal, plastic or the like by using the above composition even in a non-primer condition.

BACKGROUND ART

Various adhesives have so far been used for bonding adherends to substrates. Specific examples of the adhesives include solvent rubber-based adhesives, emulsion adhesives, and epoxy resin adhesives, among others.

Solvent rubber-based adhesives can bond adherends to substrates by taking a certain open time after application, without temporary tacking. However, the adhesives contain a solvent, hence are disadvantageous in view of the toxicity thereof to human bodies and the possibility of fire hazards, among others.

For solving the solvent-related problems, aqueous emulsion adhesives have been studied. They are, however, weak in initial adhesion and require temporary tacking. At present, they are thus not at a satisfactory level as yet. Japanese Kokai Publication Hei-03-263478 proposes a novel method of adhesion of a solvent-free contact type. This comprises the use of a moisture-curable adhesive comprising a hydrolyzable silyl group-containing polyoxyalkylene polymer and a hydrolyzable silyl group-containing (meth)acrylic ester copolymer and, like with solvent rubber-based adhesives, can effect bonding without temporary tacking of adherends after the lapse of a certain open time. However, that adhesive has a problem; a certain open time is required, namely fast bonding is impossible.

For shortening the open time, Japanese Kokai Publication Hei-04-312671 proposes a novel method of solvent-free adhesion. This comprises the combined use of a double-sided pressure sensitive adhesive tape and a solvent-free mastic type adhesive. The double-sided pressure sensitive adhesive tape enables temporary tacking of boards to substrates, so that no open time or temporary tacking is required. Further, permanent fixation is attained with solvent-free adhesive, hence no solvent odor problem arises. However, this method of adhesion still has problems. Thus, when the substrate surface is uneven, the contacting of the double-sided pressure sensitive adhesive tape may become insufficient and the adherend may go out of position. For bonding one adherend, operations are required for pressure sensitive adhesive sticking and adhesive application, raising a labor and time problem.

Under such circumstances, a method of adhesion by which adherends can be bonded to substrates without temporary tacking after application and without requiring any open time and, further, the workability is also improved has been demanded.

SUMMARY OF THE INVENTION

For solving these problems, the present inventors made intensive investigations and found out a method of bonding adherends to substrates without temporary tacking after application and without requiring any open time while improving the workability by using a curable composition having a specific composition and a specific level of viscosity. They have thus completed the present invention.

Thus, in a first aspect, the present invention relates to a method of bonding an adherend to a substrate which comprises applying a curable composition comprising at least one polymer or resin selected from the group consisting of (A) a reactive silyl group-containing polyoxyalkylene polymer, (B) a reactive silyl group-containing saturated hydrocarbon polymer, (C) a copolymer of which molecular chain is substantially made of one or more alkyl acrylate monomer unit(s) and/or alkyl methacrylate monomer unit(s) and (D) an epoxy resin and having a viscosity before curing of not lower than 10,000 Pa·s as determined on a B8U type viscometer under the following condition; rotor No. 7; number of revolutions 0.5 rpm; in an atmosphere at 23° C., according to JIS K 7117 to the adherend and/or the substrate and then joining the adherend and the substrate together without temporary tacking.

In a preferred embodiment, the invention relates to a method of adhesion in the method of adhesion as mentioned above, wherein the reactive silyl group in the component (A) and/or (B) is a group represented by the general formula (1):

$$—[Si(R^1_{2-b})(X_b)O]_m Si(R^2_{3-a})X_a \qquad (1)$$

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3 SiO—$ and, when there are two or more $R^1$ or $R^2$ groups, they may be the same or different, and R' is a univalent hydrocarbon group containing 1 to 20 carbon atoms and the three R' groups may be the same or different; X represents a hydroxyl group or a hydrolyzable group; a represents 0, 1, 2 or 3, b represents 0, 1 or 2, provided that the relation $a+\Sigma b \geq 2$ is satisfied; the numbers b in the $m —Si(R^1_{2-b})(X_b)O—$ groups may be the same or different; and m represents an integer of 0 to 19.

In a further preferred embodiment, it relates to the method of adhesion as mentioned above wherein the (A) component polyoxyalkylene polymer has a polyoxypropylene main chain skeleton.

In a further preferred embodiment, it relates to the method of adhesion as mentioned above wherein the (A) component is a reactive silyl group-containing polyoxyalkylene polymer obtainable by reacting an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with a compound represented by the general formula (3):

$$HN(R^3)—(R^4—NH)_n—R^5—Si(R^2_{3-c})X_c \qquad (3)$$

or the general formula (4):

$$HS—R^4—Si(R^2_{3-c})X_c \qquad (4)$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

In another preferred embodiment, it relates to the method of adhesion as mentioned above
wherein the (B) component saturated hydrocarbon polymer has a polyisobutylene main chain skeleton.

In still another preferred embodiment, it relates to the method of adhesion as mentioned above
in which the (C) component is a copolymer of which molecular chain is substantially composed of
(a) an alkyl acrylate and/or methacrylate monomer unit in which the alkyl group contains 1 to 8 carbon atoms and
(b) an alkyl acrylate and/or methacrylate monomer unit in which the alkyl group contains at least 10 carbon atoms.

In a further preferred embodiment, it relates to the method of adhesion as mentioned above
wherein the (C) component is a copolymer having a silicon-containing group capable of crosslinking under formation of a siloxane bond.

In still another preferred embodiment, it relates to a method of adhesion as mentioned above
wherein the adherend is a building material panel.

In accordance with a second aspect, the invention relates to a curable composition
which comprises at least one polymer or resin selected from the group consisting of
(A) a reactive silyl group-containing polyoxyalkylene polymer,
(B) a reactive silyl group-containing saturated hydrocarbon polymer,
(C) a copolymer of which molecular chain is substantially made of one or more alkyl acrylate monomer unit(s) and/or alkyl methacrylate monomer unit(s) and
(D) an epoxy resin and
which has a viscosity before curing of not lower than 10,000 Pa·s as determined on a B8U type viscometer under the following condition; rotor No. 7; in number of revolutions 0.5 rpm; in an atmosphere at 23° C., according to JIS K 7117.

In a further preferred embodiment, it relates to a curable composition as mentioned above
wherein the (A) component is a reactive silyl group-containing polyoxyalkylene polymer obtainable by reacting
an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with a compound represented by the general formula (3):

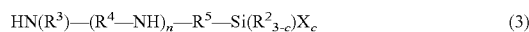

or the general formula (4):

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

In the following, the invention is described in detail.

DETAILED DISCLOSURE OF THE INVENTION

The method of adhesion according to the present invention can bond an adherend to a substrate directly after application of the curable composition to the adherend and/or substrate without waiting the lapse of an open time and without any need of temporary tacking. The adherend to which the present invention is applicable includes various industrial materials, civil engineering materials and building or construction materials and, among them, panels used as building or construction materials are preferred in view of their easy handleability and good adherability and durability.

The building material panels include, among others, cement boards, ceramic siding boards, slate boards, decorative plastic boards, particle boards, plywood, gypsum boards, artificial marble, natural stone, tiles, decorative glass, and metal panels. The substrate to which such adherends are to be bonded includes concrete, perlite boards, hard boards, mortar, slates, PC boards, ALC boards, calcium silicate boards, gypsum boards, tiles, other inorganic substrates, plywood and other woody substrates as well as metallic substrates such as studs and runners.

The term "temporary tacking" as used herein means temporary immobilization of the adherend to prevent the adherend from shifting on attaching the adherend to the substrate. Various methods are used therefor. Specifically, there may be mentioned the use of a gummed tape, a double-coated tape or the like.

The method of application of the curable composition is not particularly restricted but the composition may be applied to the adherend and/or substrate in the form of beads or dumplings. The conditions in joining the adherend to the substrate are not particularly restricted, either. There may be mentioned, for example, the method comprising bringing the adherend to a predetermined position and pressing the same against the substrate.

According to the adhesion method of the invention, the adherend can be joined to the substrate, after application of the curable composition to one or both of them, without taking any open time, namely without allowing the composition to stand until tack development.

The curable composition of the invention comprises one or more members selected from the group consisting of (A) a reactive silyl group-containing polyoxyalkylene polymer, (B) a reactive silyl group-containing saturated hydrocarbon polymer, (C) a copolymer of which molecular chain is substantially made of one or more alkyl acrylate monomer unit(s) and/or alkyl methacrylate monomer unit(s) and (D) an epoxy resin and has a viscosity before curing of not lower than 10,000 Pa·s as determined on a B8U type viscometer under the following condition; rotor No. 7; number of revolutions 0.5 rpm; in an atmosphere at 23° C., according to JIS K 7117.

The reactive silyl group in the (A) or (B) component to be used according to the invention is not particularly restricted but typically includes, among others, groups represented by the general formula (1):

$$-[Si(R^1_{2-b})(X_b)O]_m Si(R^2_{3-a})X_a \qquad (1)$$

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ and, when there are two or more $R^1$ or $R^2$ groups, they may be the same or different, and R' is a univalent hydrocarbon group containing 1 to 20 carbon atoms and the three R' groups may be the same or different; X represents a hydroxyl group or a hydrolyzable group; a represents 0, 1, 2 or 3, b represents 0, 1 or 2, provided that the relation $a + \Sigma b \geq 2$ is satisfied; the numbers b in the $m -Si(R^1_{2-b})(X_b)O-$ groups may be the same or different; and m represents an integer of 0 to 19.

The hydrolyzable group among the groups represented by X is not particularly restricted but may be any of those hydrolyzable groups known in the art. Specifically, there may be mentioned a hydrogen atom, halogen atoms, and alkoxy, acyloxy, ketoximate, amino, amide, acid amide, amioxy, mercapto and alkenyloxy groups. Among these, alkoxy groups, such as methoxy, ethoxy, propoxy and isopropoxy, are particularly preferred in view of their mild hydrolyzability and ease of handling.

One to three such hydroxyl or hydrolyzable groups can be bound to one silicon atom, and the sum $(a+\Sigma b)$ is preferably 2 to 5. When two or more hydroxyl or hydrolyzable groups are present in the reactive silyl group, they may be the same or different.

The number of silicon atoms in the reactive silyl group may be one or two or more. In the case of a reactive silyl group resulting from connection of silicon atoms by siloxane bonding or the like, the number may be about 20.

Reactive silyl groups represented by the general formula (2):

$$-Si(R^2_{3-c})X_c \qquad (2)$$

wherein $R^2$ and X are defined above and c represents 2 or 3, are preferred because of their ready availability.

As specific examples of $R^1$ and $R^2$ in the general formula (1) and (2), there may be mentioned alkyl groups such as methyl and ethyl, cycloalkyl groups such as cyclohexyl, aryl groups such as phenyl, aralkyl groups such as benzyl, and triorganosiloxy groups represented by $(R')_3SiO-$ in which R' is methyl or phenyl, for instance. A methyl group is particularly preferred as each of $R^1$, $R^2$ and R'.

The main chain structure of the (A) component polyoxyalkylene polymer to be used according to the invention may be any polymer chain whose repeating unit is a structure represented by $-R-O-$, wherein R may be an organic bivalent group containing 1 to 20 carbon atoms. The polymer may be a homopolymer in which all repeating units are of one and the same species, or a copolymer comprising two or more kinds of repeating unit. Furthermore, the main chain may have a branched structure. The group $-CH(CH_3)CH_2-$ is most preferred as R.

The main chain skeleton of the (A) component polyoxyalkylene polymer can be obtained, for example, by subjecting a monoepoxide to ring opening polymerization in the presence of an initiator and a catalyst. The initiator includes dihydric or polyhydric alcohols, and various hydroxyl-containing oligomers, among others. As specific examples of the monoepoxide, there may be mentioned ethylene oxide, propylene oxide, etc.

Usable as the catalyst are those already known in the art, for example alkali catalysts such as KOH and NaOH, acid catalysts, aluminoporphyrin metal complexes, cobalt zinc cyanaide-glyme complex catalysts and like double metal cyanide complex catalysts.

The main chain skeleton of the polyoxyalkylene polymer can also be obtained by chain extension of a hydroxyl group-terminated polyoxyalkylene polymer with a bifunctional or trifunctional isocyanate compound.

As specific examples of the isocyanate compound, there may be mentioned tolylene diisocyanate (TDI), 4,4'-diphenylmethanediisocyanate (MDI), polymeric MDI, tolidinediisocyanate, 1,5-naphthalenediisocyanate, p-phenylene diisocyanate, xylylene diisocyanate, hexamethylene diisocyanate, cyclohexyldiisocyanate, dicyclohexylmethanediisocyanate, isophoronediisocyanate, hydrogenated TDI, lysinediisocyanate, triphenylmethanetriisocyanate, tris(isocyanatophenyl) thiophosphate, tetramethylxylenediisocyanate, lysine ester triisocyanate, 1,6,11-undecanetriisocyanate, 1,8-diisocyanato-4-isocyanatomethyloctane, 1,3,6-hexamethylenetriisocyanate, bicycloheptanetriisocyanate, trimethylhexamethylene diisocyanate, etc.

Further, the main chain skeleton can also be obtained from a hydroxyl group-terminated polyoxyalkylene polymer by chain extension with a bi- or polyfunctional alkyl halide, such as $CH_2Cl_2$ and $CH_2Br_2$, in the presence of a basic compound such as KOH, NaOH, $KOCH_3$ or $NaOCH_3$.

The method of introducing the reactive silyl group into the polyoxyalkylene polymer is not particularly restricted but various methods can be used. In particular, the method is preferred which comprises reacting a polyoxyalkylene polymer having an isocyanato group at each or at least one molecular terminus with a compound represented by the general formula (3'):

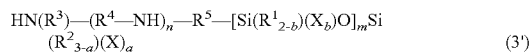

$$HN(R^3)-(R^4-NH)_n-R^5-[Si(R^1_{2-b})(X_b)O]_m Si(R^2_{3-a})(X)_a \qquad (3')$$

or the general formula (4'):

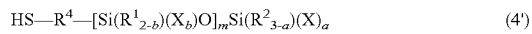

$$HS-R^4-[Si(R^1_{2-b})(X_b)O]_m Si(R^2_{3-a})(X)_a \qquad (4')$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^1$, $R^2$, X, a, b and m are as defined above.

More preferred as the general formulas (3') or (4') are the general formulas (3):

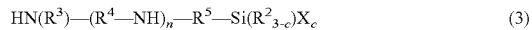

$$HN(R^3)-(R^4-NH)_n-R^5-Si(R^2_{3-c})X_c \qquad (3)$$

or the general formula (4):

$$HS-R^4-Si(R^2_{3-c})X_c \qquad (4).$$

As specific examples of the compound represented by the general formula (3') or (4'), there may be mentioned $H_2N-$ (CH$_2$)$_3$—Si(OCH$_3$)$_3$, H$_2$N—(CH$_2$)$_3$—Si(OCH$_2$CH$_3$)$_3$, H$_2$N—(CH$_2$)$_2$—NH—(CH$_2$)$_3$—Si(OCH$_3$)$_3$, H$_2$N—(CH$_2$)$_2$—NH—(CH$_2$)$_3$—Si(OCH$_2$CH$_3$)$_3$, H$_2$N—(CH$_2$)$_3$—SiCH$_3$(OCH$_3$)$_2$, H$_2$N—(CH$_2$)$_2$—NH—(CH$_2$)$_3$—SiCH$_3$(OCH$_3$)$_2$, HN(C$_6$H$_5$)—(CH$_2$)$_3$—Si(OCH$_3$)$_3$, HS—(CH$_2$)$_3$—Si(OCH$_3$)$_3$, HS—(CH$_2$)$_3$—Si(OCH$_2$CH$_3$)$_3$, HS—(CH$_2$)$_3$—SiCH$_3$(OCH$_3$)$_2$ and the like.

In addition, there may be mentioned the method which comprises reacting a polyoxyalkylene polymer having, at each or at least one terminus, an unsaturated group represented by the general formula (5):

   (5)

or the general formula (6):

   (6)

wherein R$^6$ represents a bivalent organic group containing 1 to 20 carbon atoms and R$^7$ represents a hydrocarbon group containing not more than 10 carbon atoms, with a compound represented by the general formula (7):

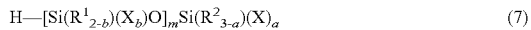   (7)

wherein R$^1$, R$^2$, X, a, b and m are as defined above, in the presence of a group VIII transition metal catalyst.

There may also be mentioned the method which comprises reacting a hydroxyl group-terminated polyoxyalkylene polymer with a reactive silyl group-containing isocyanate compound.

The polyoxyalkylene polymer having a terminal unsaturated group represented by (5) or (6) can be produced by any of the methods known in the art, for example by the method which comprises reacting a hydroxyl group-terminated polyoxyalkylene polymer with a compound having an unsaturated group to thereby introduce the unsaturated group via ether, ester, urethane, carbonate or like bonding. For introducing the unsaturated group via ether bonding, for instance, there may be mentioned the method which comprises converting the terminal hydroxyl group of the polyoxyalkylene polymer to a metaloxy group —OM (M being Na, K or the like), followed by reaction with an unsaturated group-containing halogen compound represented by the general formula (8):

   (8)

or the general formula (9):

   (9)

wherein R$^6$ and R$^7$ are as defined above and X$^2$ is a halogen atom.

As specific examples of the unsaturated group-containing compound represented by the general formula (8) or (9), there may be mentioned H$_2$C═CH—CH$_2$—Cl, H$_2$C═C(CH$_3$)—CH$_2$—Cl and the like.

As specific examples of the group VIII transition metal catalyst, there may be mentioned H$_2$PtCl$_6$·6H$_2$O, platinum-vinylsiloxane complexes, platinum-olefin complexes, etc.

Such methods of production are described in Japanese Patent No. 1247613, Japanese Kokoku Publication Hei-03-31726, WO 03/15536, Japanese Kokai Publication Hei-03-72527 and elsewhere.

The molecular weight of the polyoxyalkylene polymer is not particularly restricted. Preferably, however, the number average molecular weight is 5,000 to 50,000 as determined by GPC and expressed on the polystyrene equivalent basis, most preferably 10,000 to 30,000 or more from the curability or mechanical property viewpoint.

In particular, a reactive silyl group-containing polyoxyalkylene polymer produced by reacting an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a relatively high molecular weight by converting the terminal hydroxyl group to an isocyanato group-containing group, with a compound represented by the general formula (3) or (4) tends to show a higher viscosity as compared, on the equal molecular weight basis, with polyoxyalkylene polymers obtained by other methods, hence is advantageous in attaining a composition viscosity in the range of not lower than 10,000 Pa·s.

The term "relatively high molecular weight" as used herein means that the number average molecular weight is within the range of 7,000 to 50,000 as determined by GPC and expressed on the polystyrene equivalent basis.

Further, for the reactive silyl group-containing polyoxyalkylene polymer produced by reacting an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a relatively high molecular weight by converting the terminal hydroxyl group to an isocyanato group-containing group, with a compound represented by the general formula (3) or (4) to be equal in viscosity to the polyoxyalkylene polymer obtained by some other method, the latter polyoxyalkylene polymer have to be higher in molecular weight as compared with the former polyoxyalkylene polymer. As a result, the curing products derived from the latter polyoxyalkylene polymer tend to be low in modulus. As for the curing composition of the invention, however, it is preferred that the modulus after curing be not so low. Accordingly, the former polyoxyalkylene polymer is more preferred.

The skeleton of the reactive silyl group-containing saturated hydrocarbon polymer, namely the component (B) according to the invention, can be obtained (I) by subjecting an olefinic compound containing 1 to 6 carbon atoms, such as ethylene, propylene, 1-butene or isobutylene, as a main monomer, to polymerization, (II) by subjecting a diene compound, such as butadiene or isoprene, to homopolymerization or to copolymerization with such an olefinic compound as mentioned above, followed by hydrogenation. Isobutylene polymers and hydrogenated polybutadiene polymers are preferred since they readily allow terminal functional group introduction into them and their molecular weight can be controlled with ease and, further, the number of terminal functional groups can be increased.

It is preferred, from the ease of handling viewpoint, that the saturated hydrocarbon polymer, preferably an isobutylene polymer or hydrogenated polybutadiene polymer, have a number average molecular weight of about 5,000 to 50,000, in particular about 8,000 to 30,000 and occur as a liquid or have fluidity.

Methods of introducing a reactive silyl group into the saturated hydrocarbon polymer are now described. The isobutylene polymer having a reactive silyl group at each or at least one molecular chain terminus can be produced by using a terminal function type, preferably entirely terminal function type, isobutylene polymer produced by the so-called Inifer polymerization method (cationic polymerization using a specific compound, called Inifer, which serves as initiator and chain transfer agent). For example, a terminally unsaturated polyisobutylene is produced by dehydrohalogenation reaction of this polymer or by unsaturated group introduction reaction into the polymer, as described in Japanese Kokai Publication Sho-63-105005, for instance, and then it is reacted with a reactive silyl group-containing compound represented by the general formula (7):

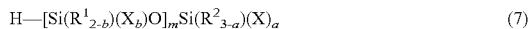

$$H—[Si(R^1{}_{2-b})(X_b)O]_m Si(R^2{}_{3-a})(X)_a \quad (7)$$

wherein $R^1$, $R^2$, X, a, b and m are as defined above, in the presence of a group VIII transition metal catalyst.

Such methods of production are described, for example, in Japanese Kokoku Publication Hei-04-69659, Japanese Kokoku Publication Hei-07-108928, Japanese Kokai Publication Sho-63-254149, Japanese Kokai Publication Sho-64-22904 and Japanese Patent No. 2539445.

An isobutylene polymer having a reactive silyl group within the molecular chain can be produced by adding a reactive silyl group-containing vinylsilane or allylsilane to a monomer composition mainly comprising isobutylene, and subjecting the resulting monomer composition to copolymerization.

In the case of the above-mentioned hydrogenated polybutadiene polymer, the hydroxyl group of the hydroxyl-terminated hydrogenated polybutadiene polymer is converted to an oxymetal group, and this is then reacted with a halogen compound having an unsaturated group such as $CH_2=CH—$, followed by further reaction with a reactive silyl group-containing compound represented by the general formula (7).

As for the alkyl acrylate monomer unit(s) in the copolymer which is to be used as component (C) according to the invention and of which molecular chain is substantially made of one or more alkyl acrylate monomer unit(s) and/or alkyl methacrylate monomer unit(s) (hereinafter such copolymer is referred to as "copolymer (C)"), those known in the art can be used widely, for example methyl acrylate, ethyl acrylate, n-propyl acrylate, n-butyl acrylate, isobutyl acrylate, tert-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, behenyl acrylate, and biphenyl acrylate. As for the alkyl methacrylate monomer unit(s), those known in the art can be used widely, including, among others, methyl methacrylate, ethyl methacrylate, n-propyl methacrylate, n-butyl methacrylate, isobutyl methacrylate, tert-butyl methacrylate, n-hexyl methacrylate, 2-ethylhexyl methacrylate, decyl methacrylate, undecyl methacrylate, lauryl methacrylate, tridecyl methacrylate, myristyl methacrylate, cetyl methacrylate, stearyl methacrylate, behenyl methacrylate, and biphenyl methacrylate.

The molecular chain of the copolymer (C) is substantially composed of one or more alkyl acrylate monomer unit(s) and/or alkyl methacrylate monomer unit(s). The term "substantially composed of such monomer unit(s)" as used herein means that the proportion of the alkyl acrylate monomer unit(s) and/or methacrylate monomer unit(s) occurring in the copolymer (C) exceeds 50%, preferably is more than 70%.

Among the copolymers (C) resulting from various possible combinations of these monomers, a preferred copolymer (hereinafter referred to as "copolymer (C)-a"), from compatibility and stability points of view, has a molecular chain substantially composed of (a) an alkyl acrylate and/or alkyl methacrylate monomer unit containing 1 to 8 carbon atoms in the alkyl moiety and (b) an alkyl acrylate and/or alkyl methacrylate monomer unit(s) containing at least 10 carbon atoms in the alkyl moiety.

The alkyl acrylate and/or alkyl methacrylate monomer unit having 1 to 8 carbon atoms in the alkyl moiety, which is the monomer unit (a), is represented by the general formula (10):

$$CH_2=C(R^8)COOR^9 \quad (10)$$

wherein $R^8$ represents a hydrogen atom or a methyl group and $R^9$ represents an alkyl group containing 1 to 8 carbon atoms.

As $R^8$ in general formula (10), there may be mentioned, for example, methyl, ethyl, etc. The monomer represented by the general formula (10) may comprise one single species or a mixture of two or more species.

The alkyl acrylate and/or alkyl methacrylate monomer unit having at least 10 carbon atoms in the alkyl moiety, which is the monomer unit (b), is represented by the general formula (11):

$$CH_2=C(R^8)COOR^{10} \quad (11)$$

wherein $R^8$ is as defined above and $R^{10}$ represents an alkyl group containing 10 or more carbon atoms.

As $R^{10}$ in general formula (11), there may be mentioned, for example, lauryl, stearyl, and other long-chain alkyl groups. The monomer represented by the general formula (11) may comprise one single species or a mixture of two or more species.

The copolymer (C) may contain, in addition to the alkyl acrylate and/or alkyl methacrylate monomer unit or units, a monomer unit(s) copolymerizable with those units.

The molecular weight of the copolymer (C) is not particularly restricted. Preferably, however, the number average molecular weight thereof as determined by GPC and expressed on the polystyrene equivalent basis is 500 to 50,000, more preferably 1,000 to 10,000 in view of the ease of handling.

The copolymer (C) can be obtained by conventional vinyl polymerization. For example, it can be obtained by solution polymerization or bulk polymerization through radical reaction. The method of production is not particularly restricted to these, however. Generally, the reaction is carried out at 50 to 150° C. following charging of the above-mentioned monomer(s), a radical initiator, a chain transfer agent, a solvent, etc.

As examples of the above-mentioned radical initiator, there may be mentioned azobisisobutyronitrile, benzoyl peroxide, and the like. As examples of the chain transfer agent, there may be mentioned n-dodecylmercaptan, tert-dodecylmercaptan, laurylmercaptan and like mercaptans, and halogen compounds. Preferred as the solvent are non-reactive solvents such as ethers, hydrocarbons and esters.

From the final bond strength viewpoint, the copolymer (C) preferably has a silyl group capable of crosslinking under formation of siloxane bonding (hereinafter such group is referred to as "reactive silyl group").

Various methods are available for introducing a reactive silyl group into the copolymer (C), including, but without being particularly limited to, (I) the method comprising copolymerizing a compound having a polymerizable unsaturated bond and a reactive silyl group with the monomers (a) and (b), (II) the method comprising copolymerizing a compound having a polymerizable unsaturated bond and a reactive functional group (hereinafter referred to as "Y group") (e.g. acrylic acid) with the monomers (a) and (b) and then reacting the thus-formed copolymer with a compound having a reactive silyl group and a functional group (hereinafter, "Y group") capable of reacting with the Y group (e.g. compound having an isocyanato group and an —Si(OCH$_3$)$_3$ group), (III) the method comprising copolymerizing the monomers (a) and (b) in the presence of a reactive silyl group-containing mercaptan as a chain transfer agent, (IV) the method comprising copolymerizing the monomers. (a) and (b) using a reactive silyl group-containing azobisnitrile compound or disulfide compound as an initiator, and (V) the method comprising polymerizing the monomers (a) and (b) in the manner of living radical polymerization and introducing a reactive silyl group into the polymer at a molecular terminus or termini, among others. It is also possible to arbitrarily combine two or more of the methods (I) to (V).

The compound having a polymerizable unsaturated bond and a reactive silyl group as mentioned above referring to method (I) is represented by the general formula (12):

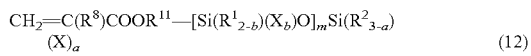
(X)$_a$                                                                                                       (12)

wherein $R^8$ is as defined above, $R^{11}$ represents a bivalent alkylene group containing 1 to 6 carbon atoms, $R^1$, $R^2$, X, a, b and m are as defined above, or the general formula (13):

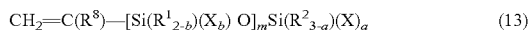
                                                                                                            (13)

wherein $R^8$, $R^1$, $R^2$, X, a, b and m are as defined above.

As $R^{11}$ in the above general formula (12), there may be mentioned methylene, ethylene and propylene group, among others. The monomer represented by the general formula (12) or (13) may comprise one single species or two or more species.

As examples of the compound having a polymerizable unsaturated bond and a reactive silyl group as represented by the general formula (12) or (13), there may be mentioned γ-methacryloxypropyltrimethoxysilane, γ-methacryloxypropylmethyldimethoxysilane, γ-methacryloxypropyltriethoxysilane and like γ-methacryloxypropylalkylpolyalkoxysilanes, γ-acryloxypropyltrimethoxysilane, γ-acryloxypropylmethyldimethoxysilane, γ-acryloxypropyltriethoxysilane and like γ-acryloxypropylalkylpolyalkoxysilanes, vinyltrimethoxysilane, vinylmethyldimethoxysilane, vinyltriethoxysilane and like vinylalkylpolyalkoxysilanes, among others.

The number of reactive silyl groups contained in the copolymer (C) is not particularly restricted but, from the viewpoint of effects on bond strength and cost, it is preferably not less than 0.1 to not more than 2.0, more preferably not less than 0.5 to not more than 1.5, on an average, in each copolymer (C) molecule.

Such methods of production are described in Japanese Kokai Publication Sho-59-122541 and Japanese Kokai Publication Sho-63-112642, for instance.

The amount of the copolymer (C) in the composition of the invention is preferably within the range of 10 to 200 parts by weight, more preferably within the range of 20 to 160 parts by weight, per 100 parts by weight of the (A) component and/or (B) component. Generally, it is selected according to the intended use and desired performance characteristics.

As the (D) component epoxy resin, those known in the art can be used widely, including, among others, bisphenol A-based epoxy resins, bisphenol F-based epoxy resins, bisphenol AD-based epoxy resins and bisphenol S-based epoxy resins, hydrogenated epoxy resins derived from these, glycidyl ester type epoxy resins, glycidylamine type epoxy resins, alicyclic epoxy resins, novolak type epoxy resins, urethane-modified epoxy resins derived from urethane prepolymers by terminal epoxidation, fluorinated epoxy resins, polybutadiene- or NBR-containing rubber-modified epoxy resins, and flame-retardant epoxy resins such as tetrabromobisphenol A glycidyl ether.

The amount of the (D) component in the composition of the invention is preferably within the range of 1 to 300 parts by weight, more preferably within the range of 5 to 200 parts by weight, per 100 parts by weight of the (A) component and/or (B) component and/or (C) component. Generally, it is selected according to the intended use and desired performance characteristics.

By adjusting the viscosity of the above composition to 10,000 Pa·s (0.5 rpm/23° C.) or above, it becomes possible to bond adherends without any open time and without temporary tacking following application. By using this adhesive composition, it becomes possible to attain good adhesion of inorganic materials as well as metal, plastic and like adherends in nonprimer systems.

When the viscosity of the composition is lower than 10,000 Pa·s (0.5 rpm/23° C.), the adherend attached may slip off unless temporary tacking is made. Further, when a polymer(s) other than (A) to (D) is (are) used, problems will arise: for example, the adhesion between adherend and substrate may decrease, the adhesion may become poor due to foaming of the adhesive, the long-term durability of adhesion may decrease due to the decrease in flexibility and/or the curability may decrease at low temperatures.

In the curable composition of the invention, there may be incorporated, where necessary, one or more of silane coupling agents, curing catalysts, epoxy resin curing agents, fillers, thixotropic agents, plasticizers, colorants, stabilizers, diluents, curing auxiliaries and so on.

As specific examples of the silane coupling agent, there may be mentioned amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethytrimethoxysilane, and β-(3,4-epoxycyclohexyl)ethyltriethoxysilane; carboxysilanes such as β-carboxyethyltriethoxysilane, β-carboxyethylphenylbis (2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; isocyanurate silanes such as tris (trimethoxysilyl) isocyanurate; isocyanato group-containing silanes such as γ-isocyanatopropyltrimethoxysilane, γ-isocyanatopropyltriethoxysilane, γ-isocyanatopropylmethyldiethoxysilane, and γ-isocyanatopropylmethyldimethoxysilane; and the like. Also usable as the silane coupling agent are derivatives obtained by modification of these, for example amino-modified silyl polymers, silylated amino polymers, unsaturated aminosilane complexes, blocked isocyanatosilanes, phenylamino-long chain alkylsilanes, aminosilylated silicones and silylated polyesters.

The silane coupling agent is used in an amount within the range of 1 to 20 parts by weight, most preferably within the range of 2 to 15 parts by weight, per 100 parts by weight of the (A) and/or (B) and/or (C) component. The silane coupling agent may comprise one single species or a mixture of two or more species.

In particular from the adhesiveness viewpoint, aminosilanes and reaction products therefrom, epoxysilanes, isocyananatosilanes are preferred.

As specific examples of the curing catalyst, those known in the art can be used widely. As specific examples thereof, there may be mentioned titanate esters such as tetrabutyl titanate and tetrapropyl titanate; organotin compounds such as dibutyltin dilaurate, dibutyltin maleate, dibutyltin diacetate, stannous octylate, stannous naphthenate, dibutyltin oxide-phthalic ester reaction products, and dibutyltin bisacetylacetonate; organoaluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacetylacetonate; lead octylate; amine compounds such as butylamine, octylamine, dibutylamine, laurylamine, monoethanolamine, diethanolamine, triathanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids or the like; acidic phosphate esters; acidic phosphate ester-amine reaction products; saturated or unsaturated polybasic carboxylic acids or acid anhydrides thereof; low-molecular-weight polyamide resins derived from a polyamine in excess and a polybasic acid; reaction products from a polyamine in excess and an epoxy compound; amino group-containing silane coupling agents such as γ-aminopropyltrimethoxysilane and N-(β-aminoethyl) aminopropylmethyldimethoxysilane; like silanol condensation catalysts and, further, other silanol condensation catalysts known in the art such as acidic catalysts and basic catalysts.

These catalysts may be used singly or two or more of them may be used in combination. The curing catalyst is used preferably in an amount of about 0.1 to 15 parts by weight, more preferably about 1 to 10 parts by weight, per 100 parts by weight of the (A) and/or (B) and/or (C) component.

From the curing rate and storable stability viewpoint, tetravalent tin catalysts are preferred.

As the epoxy resin curing agent, there may be mentioned, for example, aliphatic amines, alicyclic amines, aromatic amines, polyaminoamides, imidazoles, dicyandiamide, epoxy-modified amines, Mannich-modified amines, Michael addition-modified amines, ketimines, aldimines, acid anhydrides, alcohols and phenols.

These curing agents may be used singly or two or more of them may be used in combination. The epoxy resin curing agent is used preferably in an amount of about 5 to 100 parts by weight, more preferably about 10 to 90 parts by weight, per 100 parts by weight of the (D) component.

Ketimines and aldimines are particularly preferred since they make it possible to prepare one-package formulations.

As specific examples of the filler, there may be mentioned, among others, inorganic fillers such as calcium carbonate, magnesium carbonate, titanium oxide, carbon black, fused silica, precipitated silica, diatomaceous earth, terra alba, kaolin, clay, talc, wood flour, walnut shell flour, rice hull flour, silicic anhydride, quartz powder, aluminum powder, zinc powder, asbestos, glass fibers, carbon fibers, glass beads, alumina, glass balloons, Shirasu balloons, silica balloons, calcium oxide, magnesium oxide and silicon oxide, woody fillers such as pulp and cotton chips, and organic fillers such as pulverized rubber, regenerated rubber, finely divided thermoplastic or thermocurable resins, and polyethylene-made hollow bodies.

These fillers may be used singly or two or more of them may be used in combination.

When the filler is used in an increased amount, the viscosity increases but the workability decreases. Therefore, the filler is used preferably in an amount of about 100 to 500 parts by weight, more preferably about 120 to 400 parts by weight, per 100 parts by weight of the (A) and/or (B) and/or (C) component.

From the quality and cost viewpoint, calcium carbonate is most preferred.

Further, for adjusting the composition to a desired viscosity, a filler having a particle diameter of not larger than 0.1 μm is preferably used in an amount of about 100 to 300 parts by weight, more preferably about 120 to 250 parts by weight, per 100 parts by weight of the (A) and/or (B) and/or (C) component.

As the thixotropic agent, there may be mentioned, among others, hydrogenated castor oil, organic amide waxes, organic bentonite, calcium stearate and the like. These thixotropic agents may be used singly or two or more of them may be used in combination. From the thixotropy viewpoint, it is added preferably in an amount of about 0.1 to 50 parts by weight, more preferably about 5 to 30 parts by weight, per 100 parts by weight of the (A) and/or (b) and/or (C) component.

Examples of the plasticizer include phthalates such as dioctyl phthalate, dibutyl phthalate and butyl benzyl phthalate; aliphatic dibasic acid esters such as dioctyl adipate, isodecyl succinate and dibutyl sebacate; glycol esters such as diethylene glycol dibenzoate and pentaerythritol esters; aliphatic esters such as butyl oleate and methyl acetylricinoleate; phosphate esters such as tricresyl phosphate, trioctyl phosphate and octyl diphenyl phosphate; epoxy plasticizers such as epoxidized soybean oil, epoxidized linseed oil and benzyl epoxystearate; polyester plasticizers such as polyesters from a dibasic acid and a dihydric alcohol; polyethers such as polypropylene glycol and derivatives thereof; polystyrenes such as poly-α-methylstyrene and polystyrene; polybutadiene, butadiene-acrylonitrile copolymers, polychloroprene, polyisoprene, polybutene and chlorinated paraffins; and so forth. These plasticizers may optionally be used either singly or as a mixture of two or more of them.

The plasticizer is used preferably in an amount within the range of 20 to 300 parts by weight, most preferably within the range of 30 to 200 parts by weight, per 100 parts by weight of the (A) and/or (B) and/or (C) component. From the viscosity and/or adhesiveness viewpoint, the use of polypropylene glycol or a like polyether plasticizer is preferred.

The polyether plasticizer preferably has an average molecular weight of not less than 3,000, more preferably not less than 5,000. It is particularly preferred that the hydroxyl terminal groups be blocked.

BEST MODES FOR CARRYING OUT THE INVENTION

For further illustrating the present invention, the flowing specific examples are given below. They are, however, by no means limitative of the scope of the present invention.

SYNTHESIS EXAMPLE 1

Allyl ether group-terminated polyoxypropylene (800 g) having an average molecular weight of 8,000 was placed in a pressure reaction vessel equipped with a stirrer, and methyldimethoxysilane (1.1 [eq/vinyl group]) was added. Then, a chloroplatinic acid catalyst (chloroplatinic acid hexahydrate) ($1 \times 10^{-4}$ [eq/vinyl group] was added, and the reaction was allowed to proceed at 90° C. for 2 hours. $^1$H-NMR confirmed that the terminal functionalization percentage was 82% (polymer (A)-1).

SYNTHESIS EXAMPLE 2

Polyoxypropylene glycol (800 g) having a number average molecular weight of about 5,200 and 50.2 g of isophoronediisocyanate were placed in a pressure reaction vessel equipped with a stirrer and, after blending, 0.8 g of a tin catalyst (10% solution of dibutyltin dilaurate in DOP) was added. After 4 hours of stirring at 80° C., the isocyanate group content was found to be 0.579% by titration. Calculation based on this gave a molecular weight of about 15,000. After cooling to 60° C., γ-aminopropyltrimethoxysilane (1.0 [eq/NCO group]) was added and the mixture was stirred for about 30 minutes, when IR spectrometry confirmed the disappearance of the NCO group (polymer (A)-2)

SYNTHESIS EXAMPLE 3

Allyl ether group-terminated polyisobutylene (400 g) having an average molecular weight of 11,000 was admixed with 120 g of a process oil to serve as a hydrocarbon-based plasticizer (product of Idemitsu Kosan; Diana Process PS-32). After raising the temperature to about 75° C., methyldimethoxysilane (1.5 [eq/vinyl group]) and a platinum-(vinylsiloxane) complex ($1 \times 10^{-4}$ [eq/vinyl group]) were added, and the reaction was allowed to proceed for 20 hours. $^1$H-NMR confirmed that the terminal functionalization percentage was 80% (polymer (B)).

SYNTHESIS EXAMPLE 4

To 43 g of toluene heated to 110° C. was added dropwise over 4 hours a solution of 2.6 g of azobisisobutyronitrile (polymerization initiator) in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of toluene. The subsequent 2 hours of polymerization gave a copolymer with a solid matter concentration of 60% and a number average molecular weight (Mn) of 2,200 as determined by GPC (polystyrene equivalent).

The polymer A obtained in Synthesis Example 1 and this copolymer were blended in a solid matter ratio (weight ratio) of 60/40, and the volatile matter was removed under reduced pressure at 110° C. using an evaporator to give a transparent and viscous liquid with a solid matter concentration of not less than 99% (polymer (C)).

SYNTHESIS EXAMPLE 5

Propylene oxide was polymerized using polypropylene glycol as an initiator and zinc hexacyanocobaltate-glyme complex as a catalyst to give polyoxypropylene glycol with an average molecular weight of 10,000. Successively, a methanol solution of 1.2 equivalents, relative to the hydroxyl group of this hydroxyl-terminated polyether oligomer, of NaOMe was added, the methanol was then distilled off, and 3-chloro-1-propene was further added to thereby convert the terminal hydroxyl group to an allyl group (plasticizer A).

EXAMPLES 1 TO 5 AND COMPARATIVE EXAMPLES 1 TO 3

One-pack curable compositions of Examples 1 to 5and Comparative Examples 1 to 3 were prepared according to the formulations shown in Table 1.

COMPARATIVE EXAMPLES 9 AND 10

The synthetic rubber-based solvent type adhesive G-600 (product of Cemedine) was used in Comparative Example 9, and the polyvinyl acetate emulsion adhesive 605 (product of Cemedine) in Comparative Example 10.

(Physical Properties Evaluation)

Evaluations were made regarding the following items.

Viscosity Measurement

Viscosity measurements were made at 0.5 rpm and 23° C. using a B8U type viscometer with a No. 7 rotor according to JIS K 7117.

Slippage Resistance

Each adhesive was applied to a decorative melamine laminate (3×935×2450 mm) using a spatula, immediately followed by attachment to a mortar substrate. The decorative melamine laminate was examined, at 23° C., for the occurrence or nonoccurrence of slippage thereof from immediately after bonding.

Each adhesive was applied to a gypsum board (9.5×910×910 mm) using a spatula, immediately followed by attachment to a mortar substrate. The gypsum board was examined, at 23° C., for the occurrence or nonoccurrence of slippage thereof from immediately after bonding.

Odor

Each adhesive composition was applied to a board and examined for odor emanation until attachment to a substrate.

The evaluation results are shown in Tables 1 to 3.

Referring to Table 1:

1) synthesized in Synthesis Example 1,2) synthesized in Synthesis Example 2, 3) synthesized in Synthesis Example 4,4) a product of Yuka Shell Epoxy, 5) a product of Shiraishi Kogyo, 6) a product of Ishihara Sangyo, 7) a product of Kyowa Hakko Kogyo, 8) a product of Takeda Chemical Industries, 9) synthesized in Synthesis Example 5, 10) a product of Kusumoto Chemicals, 11) N-β-(aminoethyl)-γ-aminopropyltrime- thoxysilane, a product of Nippon Unicar, 12) vinyltrimethoxysilane, a product of Nippon Unicar, 13) γ-glycidoxypropyltrimethoxysilane, a product of Nippon Unicar, 14) a product of Ciba-Geigy (Japan), 15) a product of Sankyo, 16) a product of Ciba-Geigy (Japan), 17) a product of Nitto Kasei, 18) a product of Yuka Shell Epoxy, 19) a product of Kyoeisha Chemical, and 20) a product of Tokyo Kasei.

TABLE 1

|  |  | Example | | | | | Comparative Example | | |
| --- | --- | --- | --- | --- | --- | --- | --- | --- | --- |
|  |  | 1 | 2 | 3 | 4 | 5 | 1 | 2 | 3 |
|  | Polymer (A)-1[1)] | 100 | — | — | 100 | 100 | 100 | 100 | — |
|  | Polymer (A)-2[2)] | — | 100 | — | — | — | — | — | — |
|  | Polymer (C)[1)] | — | — | 100 | — | — | — | — | 100 |
| Epoxy resin (D) | EPIKOTE 828[4)] | — | — | — | — | — | — | — | — |
| Calcium carbonate | Hakuenka CCR[5)] | 180 | 180 | 180 | 180 | 160 | 150 | 150 | 150 |
| Titanium oxide | Tipaque R820[6)] | 20 | 20 | 20 | 20 | 20 | 20 | 20 | 20 |
| Plasticizer | DIDP[7)] | 55 | 55 | 55 | — | — | 55 | — | 55 |
|  | PPG3000[8)] | — | — | — | 55 | — | — | 55 | — |
|  | Plasticizer A[9)] | — | — | — | — | 55 | — | — | — |
| Thixotropic agent | DISPARLON 6500[10)] | 15 | 15 | 15 | 15 | 15 | 2 | 2 | 2 |
| Silane coupling | A-1120[11)] | 3 | 3 | 3 | 3 | 3 | 3 | 3 | 3 |
| agent | A-171[12)] | 2 | 2 | 2 | 2 | 2 | 2 | 2 | 2 |
|  | A-187[13)] | — | — | — | — | — | — | — | — |
| Stabilizer | TINUVIN 327[14)] | 1 | 1 | 1 | 1 | 1 | 1 | 1 | 1 |
|  | Sanol LS-770[15)] | 1 | 1 | 1 | 1 | 1 | 1 | 1 | 1 |
|  | IRGANOX 245[16)] | 1 | 1 | 1 | 1 | 1 | 1 | 1 | 1 |
| Organotin curing catalyst | U-220[17)] | 2 | 2 | 2 | 2 | 2 | 2 | 2 | 2 |
| Epoxy resin curing agent | Epicure H-30[18)] | — | — | — | — | — | — | — | — |
| Diluent | Epolite M1230[19)] | — | — | — | — | — | — | — | — |
| Viscosity evaluation | Viscosity at 0.5 rpm (Pa·s) | 19,400 | 24,500 | 22,400 | 21,500 | 17,800 | 6,720 | 7,020 | 6,460 |
| Slippage resistance evaluation | Melamine board slippage | No | No | No | No | No | Yes | Yes | Yes |
|  | Gypsum board slippage | No | No | No | No | No | Yes | Yes | Yes |
| Working environment evaluation | Odor emanation | No | No | No | No | No | No | No | No |

TABLE 3

|  |  | Comparative Example | |
| --- | --- | --- | --- |
|  |  | 9 Synthetic rubber-based solvent adhesive G-600 | 10 Polyvinyl acetate emulsion adhesive 605 |
| Viscosity evaluation | Viscosity at 0.5 rpm(Pa·s) | — | — |
| Slippage resistance evaluation | Melamine board slippage | Yes | Yes |
|  | Gypsum board slippage | Yes | Yes |
| Working environment evaluation | Odor emanation | Yes | No |

The compositions of Examples 1 to 5 all showed a viscosity not lower than 10,000 Pa·s at 0.5 rpm and, in slippage resistance evaluation using the decorative melamine board and gypsum board, no slippage was observed at all with them. On the other hand, the viscosity was lower than 10,000 Pa·s in all of Comparative Examples 1 to 3 and slippage was observed in all of them. As for the odor during adhesive application and attaching operations, the odor emanation was at a problem-free level in Examples 1 to 5 and Comparative Examples 1 to 3 and 10. In Comparative Example 9 alone, a strong odor emanated, hence the working environment was unpleasant.

INDUSTRIAL APPLICABILITY

By using a moisture-curable adhesive composition having a specific composition and a specific viscosity, it becomes possible to bond adherends without open time and without temporary tacking after application. When this composition is used, satisfactory bonding of inorganic materials, metals and plastics can be attained even on a nonprimer basis.

The invention claimed is:

1. A method of bonding an adherend to a substrate which comprises applying a curable composition comprising at least one polymer or resin selected from the group consisting of (A) a reactive silyl group-containing polyoxyalkylene polymer,
(B) a reactive silyl group-containing saturated hydrocarbon polymer,
(C) a copolymer of which molecular chain is substantially made of one or more alkyl acrylate monomer unit(s) and/or alkyl methacrylate monomer unit(s),
(D) an epoxy resin,
(E) 120 to 250 parts by weight of a colloidal calcium carbonate having a particle diameter of not larger than 0.1 μm per 100 parts by weight of the (A) and/or (C) component and
(F) 15 to 30 parts by weight of a thixotropic agent per 100 parts by weight of the (A) and/or (C) component, and having a viscosity before curing of not lower than 10,000 Pa·s as determined on a B8U type viscometer under the following condition; rotor No. 7; number of revolutions 0.5 rpm; in an atmosphere at 23°C., according to JIS K 7117 to the adherend and/or the substrate and then joining the adherend and the substrate together without temporary tacking wherein the adherend is a building material panel selected from the group consisting of decorative plastic boards and gypsum boards, and the substrate is mortar.

2. The method of adhesion according to claim 1,
wherein the reactive silyl group in the component (A) is a group represented by the general formula (1):

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—and, when there are two or more $R^1$ or $R^2$ groups, they may be the same or different, and R' is a univalent hydrocarbon group containing 1 to 20 carbon atoms and the three R' groups may be the same or different; X represents a hydroxyl group or a hydrolysable group; a represents 0, 1, 2 or 3, b represents 0, 1 or 2, provided that the relation a +Σb≧2 is satisfied; the numbers b in the m —$Si(R^1_{2-b})(X_b)O$— groups may be the same or different; and m represents an integer of 0 to 19.

3. The method of adhesion according to claim 2, wherein the (A) component polyoxyalkylene polymer has a polyoxypropylene main chain skeleton.

4. The method of adhesion according to claim 2,
wherein the (A) component is a reactive silyl group-containing polyoxyalkylene polymer obtained by reacting
an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with
a compound represented by the general formula (3):

$$HN(R^3)\text{—}(R^4\text{—}NH)_n\text{—}R^5\text{—}Si(R^2_{3-c})X_c \qquad (3)$$

or the general formula (4):

$$HS\text{—}R^4\text{—}Si(R^2_{3-c})X_c \qquad (4)$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

5. The method of adhesion according to claim 1,
wherein the (A) component polyoxyalkylene polymer has a polyoxypropylene main chain skeleton.

6. The method of adhesion according to claim 5,
wherein the (A) component is a reactive silyl group-containing polyoxyalkylene polymer obtained by reacting
an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with
a compound represented by the general formula (3):

$$HN(R^3)\text{—}(R^4\text{—}NH)_n\text{—}R^5\text{—}Si(R^2_{3-c})X_c \qquad (3)$$

or the general formula (4):

$$HS\text{—}R^4\text{—}Si(R^2_{3-c})X_c \qquad (4)$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

7. The method of adhesion according to claim 1,
wherein the (A) component is a reactive silyl group-containing polyoxyalkylene polymer obtained by reacting
an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with
a compound represented by the general formula (3):

$$HN(R^3)\text{—}(R^4\text{—}NH)_n\text{—}R^5\text{—}Si(R^2_{3-c})X_c \qquad (3)$$

or the general formula (4):

$$HS\text{—}R^4\text{—}Si(R^2_{3-c})X_c \qquad (4)$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

8. The method of adhesion according to claim 1, in which the (C) component is a copolymer of which molecular chain is substantially composed of
(a) an alkyl acrylate and/or methacrylate monomer unit in which the alkyl group contains 1 to 8 carbon atoms and
(b) an alkyl acrylate and/or methacrylate monomer unit in which the alkyl group contains at least 10 carbon atoms.

9. The method of adhesion according to claim 8, wherein the (C) component is a copolymer having a silicon-containing group capable of crosslinking under formation of a siloxane bond.

10. A curable composition which comprises at least one polymer or resin selected from the group consisting of
(A) a reactive silyl group-containing polyoxyalkylene polymer, and
(C) a copolymer of which molecular chain is substantially made of one or more alkyl acrylate monomer unit(s) and/or alkyl methacrylate monomer unit(s)
which has a viscosity before curing of not lower than 10,000 Pa·s as determined on a B8U type viscometer under the following condition; rotor No. 7; in number of revolutions 0.5 rpm; in an atmosphere at 23° C., according to JIS K 7117
(E) 120 to 250 parts by weight of a colloidal calcium carbonate having a particle diameter of not lager than 0.1 μm per 100 parts by weight of the (A) and/or (C) component, and
(F) 15 to 30 parts by weight of a thixotropic agent per 100 parts by weight of the (A) and/or (C) component.

11. The curable composition according to claim 10, wherein the (A) component is a reactive silyl group-containing polyoxyalkylene polymer obtained by reacting an isocyanato group-terminated polyoxyalkylene polymer derived from a hydroxyl group-terminated polyoxyalkylene polymer by chain extension with a bifunctional or trifunctional isocyanate compound, or an isocyanato group-terminated polyoxyalkylene polymer derived from a hydroxyl group-terminated polyoxyalkylene polymer having a number average molecular weight of 7,000 to 50,000, as determined by GPC and expressed on the polystyrene equivalent basis, by converting the terminal hydroxyl group to an isocyanato group-containing group with a compound represented by the general formula (3):

$$HN(R^3)-(R^4-NH)_n-R^5-Si(R^2{}_{3-c})X_c \quad (3)$$

or the general formula (4):

$$HS-R^4-Si(R^2{}_{3-c})X_c \quad (4)$$

wherein $R^3$ represents a hydrogen atom, an alkyl group containing not more than 10 carbon atoms, an aryl group containing 6 to 15 carbon atoms or an aralkyl group containing 7 to 15 carbon atoms; $R^4$ and $R^5$ each represents a bivalent organic group containing not more than 10 carbon atoms; n represents an integer of 0 to 10; $R^2$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ and, when there are two or more $R^2$ groups, they may be the same or different, and R' is a univalent hydrocarbon group containing 1 to 20 carbon atoms and the three R' groups may be the same or different; X represents a hydroxyl group or a hydrolyzable group; and c represents 2 or 3.

\* \* \* \* \*